US012763334B2

(12) United States Patent
Jin et al.

(10) Patent No.: US 12,763,334 B2
(45) Date of Patent: Oct. 13, 2026

(54) COPPER FOIL CAPABLE OF PREVENTING TEAR OR WRINKLE DEFECTS, ELECTRODE COMPRISING THE SAME, SECONDARY BATTERY COMPRISING THE SAME, AND METHOD FOR MANUFACTURING THE SAME

(71) Applicant: SK NEXILIS CO., LTD., Jeongeup-si (KR)

(72) Inventors: Shan Hua Jin, Jeongeup-si (KR); Min Seok Yoon, Jeongeup-si (KR)

(73) Assignee: SK NEXILIS CO., LTD., Jeongeup-si (KR)

(*) Notice: Subject to any disclaimer, the term of this patent is extended or adjusted under 35 U.S.C. 154(b) by 462 days.

(21) Appl. No.: 18/392,730

(22) Filed: Dec. 21, 2023

(65) Prior Publication Data

US 2024/0213490 A1 Jun. 27, 2024

(30) Foreign Application Priority Data

Dec. 27, 2022 (KR) ........................ 10-2022-0185255
Oct. 5, 2023 (KR) ........................ 10-2023-0132912

(51) Int. Cl.

*H01M 4/66* (2006.01)
*H01M 4/134* (2010.01)
*H01M 4/75* (2006.01)
*H01M 10/0525* (2010.01)

(52) U.S. Cl.

CPC ........... *H01M 4/661* (2013.01); *H01M 4/134* (2013.01); *H01M 4/667* (2013.01); *H01M 4/75* (2013.01); *H01M 10/0525* (2013.01)

(58) Field of Classification Search

CPC ...... H01M 4/661; H01M 4/134; H01M 4/667; H01M 4/75; H01M 10/0525; Y02E 60/10
See application file for complete search history.

(56) References Cited

U.S. PATENT DOCUMENTS 11,505,873 B2 * 11/2022 Jin ........................ H01M 4/661
2016/0365545 A1 * 12/2016 Takahagi ................ B32B 27/36
2019/0003066 A1 * 1/2019 Kim ...................... H01M 4/667
2019/0006658 A1 * 1/2019 Chae ................... H01M 4/1395
2019/0017188 A1 * 1/2019 Kim ......................... C25D 5/48
2019/0036126 A1 * 1/2019 Kim ......................... C25D 1/04

FOREIGN PATENT DOCUMENTS

CN 102965699 * 3/2013 ............... C25D 3/38
CN 110644021 * 1/2020 ............... C25D 1/04
CN 111455414 * 7/2020 ............... C25D 1/04

(Continued)

OTHER PUBLICATIONS

CN 102965699 machine English translation (Year: 2013).*

(Continued)

*Primary Examiner* — Michael L Dignan
(74) *Attorney, Agent, or Firm* — Crowell & Moring LLP

(57) ABSTRACT

According to one embodiment of the present disclosure, there is provided a copper foil including a copper film including 99.9 wt % or more of copper, wherein the copper foil has a first stress factor in a range of 2.8 to 3.2, a second stress factor in a range of 2.5 to 3.0, and a third stress factor in a range of 3.5 to 4.5, and a method for manufacturing the copper foil.

3 Claims, 5 Drawing Sheets

(56) References Cited

FOREIGN PATENT DOCUMENTS

| | | | |
|---|---|---|---|
| JP | 2012212529 | A | 11/2012 |
| KR | 19990076497 | A | 10/1999 |
| KR | 20140003511 | A | 1/2014 |
| KR | 101669087 | | 10/2016 |
| KR | 20160134636 | A | 11/2016 |
| KR | 20210056073 | A | 5/2021 |
| TW | 201439384 | A | 10/2014 |

OTHER PUBLICATIONS

CN 110644021 machine English translation (Year: 2020).*
CN 111455414 machine English translation (Year: 2020).*
International Search Report for related International Application No. PCT/KR2023/018615; action dated Mar. 13, 2024; (6 pages).
Office Action for related Taiwanese Application No. 11320988080; action dated Sep. 30, 2024; (5 pages).

* cited by examiner

COPPER FOIL CAPABLE OF PREVENTING TEAR OR WRINKLE DEFECTS, ELECTRODE COMPRISING THE SAME, SECONDARY BATTERY COMPRISING THE SAME, AND METHOD FOR MANUFACTURING THE SAME

CROSS-REFERENCE TO RELATED APPLICATIONS

This application claims the benefit of the Korean Patent Applications No. 10-2022-0185255 filed on Dec. 27, 2022 and No. 10-2023-0132912 filed on Oct. 5, 2023, which are hereby incorporated by reference as if fully set forth herein.

FIELD

The present disclosure relates to a copper foil capable of preventing tear or wrinkle defects therein, an electrode including the same, a secondary battery including the same, and a method for manufacturing the same.

BACKGROUND

Secondary batteries are types of energy conversion devices that convert electrical energy into chemical energy, store the chemical energy therein, and then convert the chemical energy back to electrical energy when electricity is needed, thereby generating electricity. The secondary batteries are used as energy sources for electric vehicles as well as portable home appliances such as mobile phones, laptop computers, and the like. The secondary batteries are rechargeable and thus are also referred to as rechargeable batteries.

As secondary batteries that have economic and environmental advantages over disposable primary batteries, there are lead-acid batteries, nickel-cadmium secondary batteries, nickel-hydrogen secondary batteries, and lithium secondary batteries.

In particular, lithium secondary batteries may store a relatively large amount of energy relative to their size and weight compared with other secondary batteries. Accordingly, in the field of information communication devices in which portability and mobility are important, lithium secondary batteries are preferred, and an application range thereof is also expanding to energy storage devices for hybrid vehicles and electric vehicles.

Lithium secondary batteries are repeatedly used through one cycle of charging and discharging. When a certain device is operated with a fully charged lithium secondary battery, the lithium secondary battery should have a high charge/discharge capacity in order to increase the operating time of the device. Accordingly, research to satisfy ever-increasing expectations (needs) of consumers regarding the charge/discharge capacity of a lithium secondary battery is continuously required.

Such a secondary battery includes an anode current collector made of a copper foil, and among copper foils, an electrolytic copper foil is widely used as the anode current collector of the secondary battery. Along with an increase in demand for secondary batteries, as the demand for high-capacity, high-efficiency, and high-quality secondary batteries increases, an electrolytic copper foil capable of improving the characteristics of secondary batteries is required. In particular, an electrolytic copper foil capable of securing a high capacity and stable capacity retention of the secondary battery is required.

Meanwhile, as the copper foil becomes thinner, the amount of active material that can be included in the same space may be increased, and the number of current collectors may be increased, and thus the capacity of secondary batteries can be increased. However, as the copper foil becomes thinner, curling occurs, and thus, when the copper foil is wound, defects such as tears or wrinkles in the copper foil occur due to the curling of an edge, and accordingly, there is difficulty in manufacturing copper foils in the form of a very thin film. Accordingly, in order to manufacture a copper foil having a very thin thickness, the curling of the copper foil should be prevented.

SUMMARY

Accordingly, the present disclosure relates to a copper foil capable of preventing the problems caused by the limitations and disadvantages of the related art described above, an electrode including the same, a secondary battery including the same, and a method for manufacturing the same.

According to one embodiment of the present disclosure, there is provided a copper foil that is not wrinkled or torn by having a first stress factor value in a range of 2.8 to 3.2.

According to one embodiment of the present disclosure, there is provided a copper foil that is not wrinkled or torn by having a second stress factor value in a range of 2.5 to 3.0.

According to one embodiment of the present disclosure, there is provided a copper foil that is not wrinkled or torn by having a third stress factor value in a range of 3.5 to 4.5.

According to another embodiment of the present disclosure, there is provided an electrode for a secondary battery including the copper foil, and a secondary battery including the electrode for a secondary battery.

According to still another embodiment of the present disclosure, there is provided a method for manufacturing a copper foil in which the occurrence of curls, wrinkles, or tears is prevented.

In addition to the aspects of the present disclosure described above, other features and advantages of the present disclosure will be described in the following detailed description, or may be clearly understood by those skilled in the art to which the present disclosure pertains from such description.

According to one embodiment of the present disclosure, there is provided a copper foil including a copper film including 99.9 wt % or more of copper, wherein the copper foil has a first stress factor in a range of 2.8 to 3.2, a second stress factor in a range of 2.5 to 3.0, and a third stress factor in a range of 3.5 to 4.5. The first stress factor is calculated by Equation 1, $$\text{first stress factor} = A/A' + B/B' + C/C', \quad \text{[Equation 1]}$$

the second stress factor is calculated by Equation 2, $$\text{second stress factor} = A/B + A'/B', \quad \text{[Equation 2]}$$

and the third stress factor is calculated by Equation 3 below, $$\text{third stress factor} = A/C + A'/C', \quad \text{[Equation 3]}$$

wherein A in Equation 1 is a stress at 50% elongation in a machine direction (MD direction), A' in Equation 1 is a stress at 50% elongation in a transverse direction (TD direction), B in Equation 1 is a stress at 10% elongation in the MD direction, B' in Equation 1 is a stress at 10% elongation in the TD direction, C in Equation 1 is a stress at 5% elongation in the MD direction, and C' in Equation 1 is a stress at 5% elongation in the TD direction.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
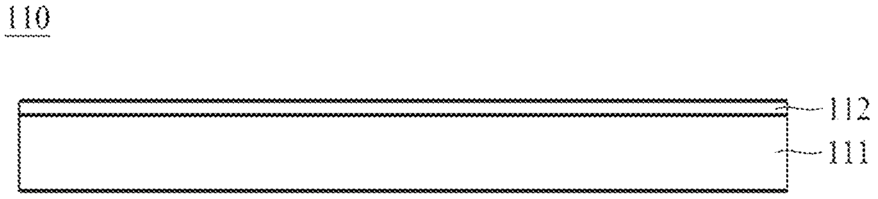
FIG. 1 is a cross-sectional view of a copper foil according to one embodiment of the present disclosure.

Hereinafter, embodiments of the present disclosure will be described in detail with reference to the accompanying drawings. However, the embodiments described below are presented only for illustrative purposes to facilitate a clear understanding of the present disclosure and do not limit the scope of the present disclosure.

Shapes, sizes, ratios, angles, numbers, and the like disclosed in the drawings for describing the embodiments of the present disclosure are illustrative, and thus the present disclosure is not limited to the details illustrated in the drawings. Throughout the present specification, the same components may be referred to by the same reference numerals. In describing the present disclosure, detailed descriptions of related known technologies will be omitted when it is determined that they may unnecessarily obscure the gist of the present disclosure.

When terms "including," "having," "consisting of," and the like described in the present specification are used, other parts may be added unless the term "only" is used herein. When a component is expressed in the singular form, the plural form is included unless otherwise specified. In addition, in interpreting a component, it is interpreted as including an error range even when not explicitly stated.

In describing a positional relationship, for example, when a positional relationship of two parts is described as being "on," "above," "below, "next to," or the like, unless "immediately" or "directly" is used, one or more other parts may be located between the two parts.

Spatially relative terms, such as "below," "beneath," "lower," "above," "upper" and the like, may be used herein for ease of description to describe one element or component's relationship to another element(s) or component(s) as illustrated in the drawings. It will be understood that the spatially relative terms are intended to include different orientations of the element in use or operation in addition to the orientation illustrated in the drawings. For example, when an element in the drawings is turned over, an element described as being "above" or "upper" relative to another element will then be "below" or "lower" relative to the other element. Thus, the exemplary term "below" may include both above and below orientations. Likewise, the exemplary terms "above" or "upper" may include both above and below orientations.

In describing a temporal relationship, for example, when a temporal relationship is described as being "after," "subsequent," "next to," "prior to," or the like, unless "immediately" or "directly" is used, cases that are not continuous may also be included.

In order to describe various components, terms such as "first," "second," and the like are used, but these components are not limited by these terms. These terms are only used to distinguish one component from another component. Accordingly, a first component described below may be a second component within the technical spirit of the present disclosure.

The term "at least one" should be understood to include all possible combinations from one or more related items. For example, the meaning of "at least one of first, second, and third items" may mean all combinations of two or more items of the first, second and third items as well as each of the first, second and third items.

The features of various embodiments of the present disclosure may be partially or wholly coupled to or combined with each other, and may be various technically linked or operated, and each of the embodiments may be implemented independently of each other or may be implemented together in a related relationship.

FIG. 1 is a cross-sectional view of a copper foil 110 according to one embodiment of the present disclosure.

Figure 2:
FIG. 2 is a cross-sectional view of a copper foil according to another embodiment of the present disclosure.

Referring to FIG. 1, the copper foil 110 of the present disclosure includes a copper film 111 including 99.9 wt % or more of copper and a protective layer 112 formed on the copper film 111. In the copper foil 110 illustrated in FIG. 1, the protective layer 112 is formed on one surface of the copper film 111, but the embodiments of the present disclosure are not limited thereto. Referring to FIG. 2, the protective layer 112 may be formed on each of both surfaces of the copper film 111.

The copper film 111 may be formed on a rotating anode drum through electroplating, and has a shiny surface that is in direct contact with the rotating anode drum in an electroplating process and a matte surface opposite to the shiny surface.

The protective layer 112 is formed by electrodepositing an anticorrosion material on the copper film 111. The anticorrosion material may include at least one of a chromium compound, a silane compound, and a nitrogen compound. The protective layer 112 prevents oxidation and corrosion of the copper film 111 and improves heat resistance, thereby increasing a lifespan of a final product including the copper foil 110 as well as a lifespan of the copper foil 110 itself.

According to one embodiment of the present disclosure, the copper foil 110 has a first stress factor value in a range of 2.8 to 3.2. The first stress factor value may be obtained by measuring each of A, A', B, B', C, and C' and substituting the measured A, A', B, B', C, and C' values into Equation 1 below.

$$\text{First stress factor} = A/A' + B/B' + C/C' \qquad \text{[Equation 1]}$$

A in Equation 1 means a stress at 50% elongation of the copper foil 110 in a machine direction (MD direction), A' in Equation 1 means a stress at 50% elongation of the copper foil 110 in a transverse direction (TD direction), B in Equation 1 means a stress at 10% elongation of the copper foil 110 in the MD direction, B' in Equation 1 means a stress at 10% elongation of the copper foil 110 in the TD direction, C in Equation 1 means a stress at 5% elongation in the MD direction, and "C'" in Equation 1 means a stress at 5% elongation in the TD direction. In this case, A, A', B, B', C, and C' are measured using a universal tensile testing machine (UTM).

Figure 7:
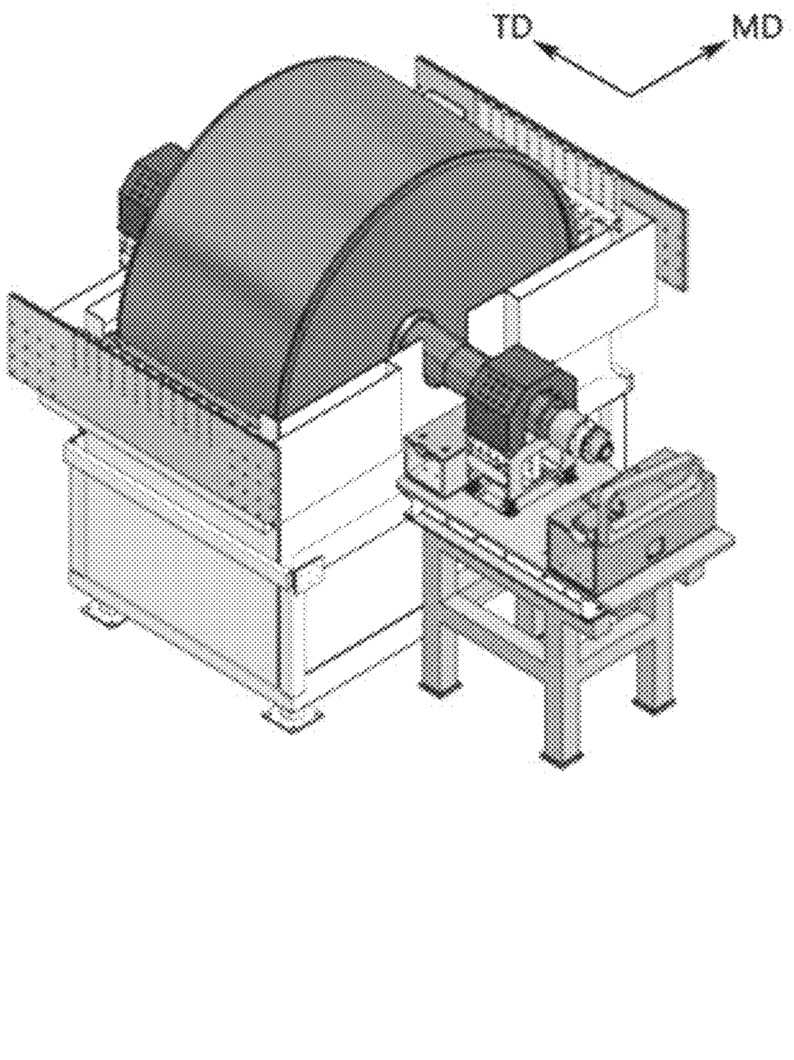
FIG. 7 is a schematic diagram for explaining MD and TD.

Referring to FIG. 7, there are MD (a machine direction or length direction) and TD (a transverse direction or width direction), and surface properties are different between the machine direction and the width direction. In the copper foil 110 according to one embodiment of the present disclosure, the difference in surface properties between the MD direction and the TD direction is minimized.

According to one embodiment of the present disclosure, the copper foil 110 may have a first stress factor value of 2.8 or more.

When the first stress factor value of the copper foil 110 is less than 2.8, a stress difference between the MD and TD directions may be large when the copper foil 110 is stretched. As a result, wrinkles or tears may occur during a manufacturing process of the copper foil 110, and pinholes or curls may occur on a surface of the copper foil 110. Accordingly, workability may be reduced, and a defect rate of the secondary battery may be increased.

Accordingly, in order to prevent the occurrence of wrinkles or tears during the manufacturing process of the copper foil 110, the first stress factor value of the copper foil 110 needs to be 2.8 or more.

According to one embodiment of the present disclosure, the copper foil 110 may have a second stress factor value of 2.5 or more.

The second stress factor value may be obtained by measuring each of A, A', B, and B' and substituting the measured A, A', B, and B' values into Equation 2 below.

$$\text{Second stress factor} = A/B + A'/B'. \qquad \text{[Equation 2]}$$

When the second stress factor value of the copper foil 110 is less than 2.5, a stress difference may occur in the MD and TD directions at 10% and 50% elongations of the copper foil 110. As a result, wrinkles or tears may occur during the manufacturing process of the copper foil 110, and pinholes or curls may occur on the surface of the copper foil 110. Accordingly, the charge and discharge efficiency of an anode material may be reduced, or workability may be reduced, and thus the defect rate of the secondary battery may be increased.

Accordingly, in order to prevent the occurrence of wrinkles or tears during the manufacturing process of the copper foil 110, the second stress factor value of the copper foil 110 needs to be 2.5 or more.

According to one embodiment of the present disclosure, the copper foil 110 may have a third stress factor value of 3.5 or more.

The third stress factor value may be obtained by measuring each of A, A', C, and C' and substituting the measured A, A', C, and C' values into Equation 3 below.

$$\text{Third stress factor} = A/C + A'/C'. \qquad \text{[Equation 3]}$$

When the third stress factor value of the copper foil 110 is less than 3.5, a stress difference may occur in the MD and TD directions at 5% and 10% elongations of the copper foil 110. As a result, wrinkles or tears may occur during the manufacturing process of the copper foil 110, and pinholes or curls may occur on the surface of the copper foil 110. Accordingly, the charge and discharge efficiency of the anode material may be reduced, or workability may be reduced, and thus a defect rate of the secondary battery may be increased.

Accordingly, in order to prevent the occurrence of wrinkles or tears during the manufacturing process of the copper foil 110, the third stress factor value of the copper foil 110 needs to be 3.5 or more.

The copper foil 110 according to one embodiment of the present disclosure has a thickness of 4 μm to 35 μm. When the copper foil 110 is used as a current collector of an electrode in a secondary battery, as the thickness of the copper foil 110 becomes smaller, more current collectors can be accommodated in the same space, which is advantageous for increasing the capacity of the secondary battery. However, the manufacture of a copper foil 110 having a thickness of less than 4 μm causes a decrease in workability.

On the other hand, when the secondary battery is manufactured with a copper foil 110 having a thickness exceeding 35 μm, it becomes difficult to realize high capacity due to the thick copper foil 110.

The copper foil 110 according to one embodiment of the present disclosure may have a tensile strength of 45 $kg/mm^2$ or more. In order to suppress wrinkling and tearing of the copper foil 110, the copper foil 110 of the present disclosure has a high tensile strength of 45 $kg/mm^2$ or more. When the tensile strength of the copper foil 110 is less than 45 $kg/mm^2$, during a roll-to-roll manufacturing process, folding of the copper foil 110 is caused between two adjacent rolls, or wrinkling of lateral end portions of the copper foil 110 is caused.

The copper foil 110 according to one embodiment of the present disclosure may have an elongation of 3% to 13%.

In a case in which the elongation of the copper foil 110 is less than 3%, when the copper foil 110 is used as a current collector of a secondary battery, there is a high risk that the copper foil 110 will be torn because it cannot be stretched sufficiently in response to a large expansion in volume of a high-capacity active material.

On the other hand, when the elongation of the copper foil 110 exceeds 13%, the copper foil 110 is easily stretched in a process of manufacturing an electrode for a secondary battery, thereby causing deformation in the electrode.

According to one embodiment of the present disclosure, the copper foil 110 may have a ten-point average roughness (Rz) of 0.7 μm to 0.9 μm.

As the secondary battery is repeatedly charged and discharged, an active material layer may alternately contract and expand, which leads to the separation of the active material layer from the copper foil 110, thus reducing the charge and discharge efficiency of the secondary battery. Accordingly, in order to secure a certain level or higher of capacity retention rate and lifespan of the secondary battery (that is, in order to suppress the deterioration of charge and discharge efficiency of the secondary battery), the adhesive strength between the copper foil 110 and the active material layer should be high by allowing the copper foil 110 to have an excellent coatability on the active material.

Specifically, as the ten-point average roughness (Rz) of the copper foil 110 is smaller, the charge and discharge efficiency of the secondary battery including the copper foil 110 tends to be less reduced. Thus, according to one embodiment of the present disclosure, the copper foil 110 has a ten-point average roughness (Rz) of 0.7 to μm 0.9 μm.

When the ten-point average roughness (Rz) of the copper foil 110 is less than 0.7 μm, the surface area of the copper foil 110 is relatively small such that the active material is easily detached from the copper foil 110, and as a result, rapid lifespan deterioration of the secondary battery due to repeated charging and discharging is caused.

On the other hand, when the ten-point average roughness (Rz) of the copper foil 110 exceeds 0.9 μm, a plurality of spaces are present between the copper foil 110 and the active material layer between contact uniformity between the copper foil 110 and the active material layer does not reach a predetermined level (i.e., the coating itself is partially performed), and as a result, rapid lifespan deterioration of the secondary battery due to repeated charging and discharging is caused.

Hereinafter, an electrode 100 including the copper foil 110 of the present disclosure and a secondary battery including the electrode 100 will be described in detail.

Figure 3:
FIG. 3 is a cross-sectional view of an electrode for a secondary battery according to still another embodiment of the present disclosure.

FIG. 3 is a cross-sectional view of an electrode for a secondary battery according to one embodiment of the present disclosure.

As illustrated in FIG. 3, the electrode 100 for a secondary battery according to one embodiment of the present disclosure includes the copper foil 110 of one of the above-described embodiments of the present disclosure and an active material layer 120.

Figure 4:
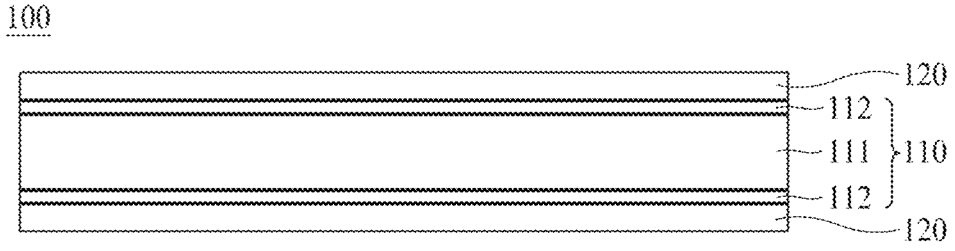
FIG. 4 is a cross-sectional view of an electrode for a secondary battery according to yet another embodiment of the present disclosure.

FIG. 3 illustrates a configuration in which the active material layer 120 is formed on one surface of the copper foil 110. However, the present disclosure is not limited to this embodiment, and referring to FIG. 4, the active material layer 120 may be formed on each of both surfaces of the copper foil 110.

Generally, in a lithium secondary battery, an aluminum foil is used as a cathode current collector combined with a cathode active material, and the copper foil 110 is used as an anode current collector combined with anode active material.

According to one embodiment of the present disclosure, the electrode 100 for a secondary battery is an anode, the copper foil 110 is used as an anode current collector, and the active material layer 120 includes an anode active material.

In order to secure a high capacity of a secondary battery, the active material layer 120 of the present disclosure may be formed of a composite of carbon and metal. The metal may include, for example, at least one of silicon (Si), germanium (Ge), tin (Sn), lithium (Li), zinc (Zn), magnesium (Mg), cadmium (Cd), cerium (Ce), nickel (Ni), and iron (Fe), and preferably, may include Si and/or Sn.

Figure 5:
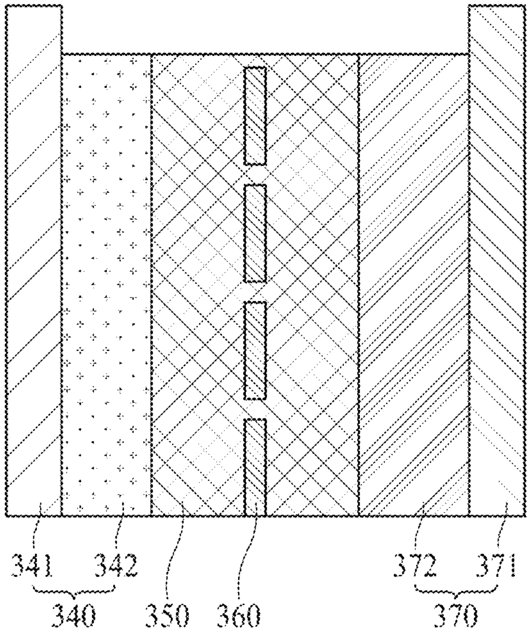
FIG. 5 is a schematic cross-sectional view of a secondary battery according to yet another embodiment of the present disclosure.

FIG. 5 is a schematic cross-sectional view of a secondary battery according to one embodiment of the present disclosure.

Referring to FIG. 5, the secondary battery includes a cathode 370, an anode 340, an electrolyte 350 disposed between the cathode 370 and the anode 340 to provide an environment in which ions can move, and a separator 360 electrically insulating the cathode 370 and the anode 340. Here, the ions moving between the cathode 370 and the anode 340 are, for example, lithium ions. The separator 360 separates the cathode 370 and the anode 340 in order to prevent charges generated at one electrode from being needlessly consumed by moving to the other electrode through the inside of the secondary battery. Referring to FIG. 5, the separator 360 is disposed in the electrolyte 350.

The cathode 370 includes a cathode current collector 371 and a cathode active material layer 372, and an aluminum foil may be used as the cathode current collector 371.

The anode 340 includes an anode current collector 341 and an anode active material layer 342, and the copper foil 110 may be used as the anode current collector 341.

According to one embodiment of the present disclosure, the copper foil 110 disclosed in FIG. 1 or 2 may be used as the anode current collector 341. In addition, the electrode 100 for a secondary battery illustrated in FIG. 3 or 4 may be used as the anode 340 of the secondary battery illustrated in FIG. 5.

Hereinafter, a method for manufacturing the copper foil 110 of the present disclosure will be described in detail with reference to FIG. 6.

The method for manufacturing the copper foil 110 of the present disclosure includes forming a copper film 111, and forming a protective layer 112 on the copper film 111.

The method of the present disclosure includes forming the copper film 111 on a rotating anode drum 40 by electrically connecting a cathode plate 30 and the rotating anode drum 40, which are disposed to be spaced apart from each other in an electrolyte 20 in an electrolytic bath 10.

Figure 6:
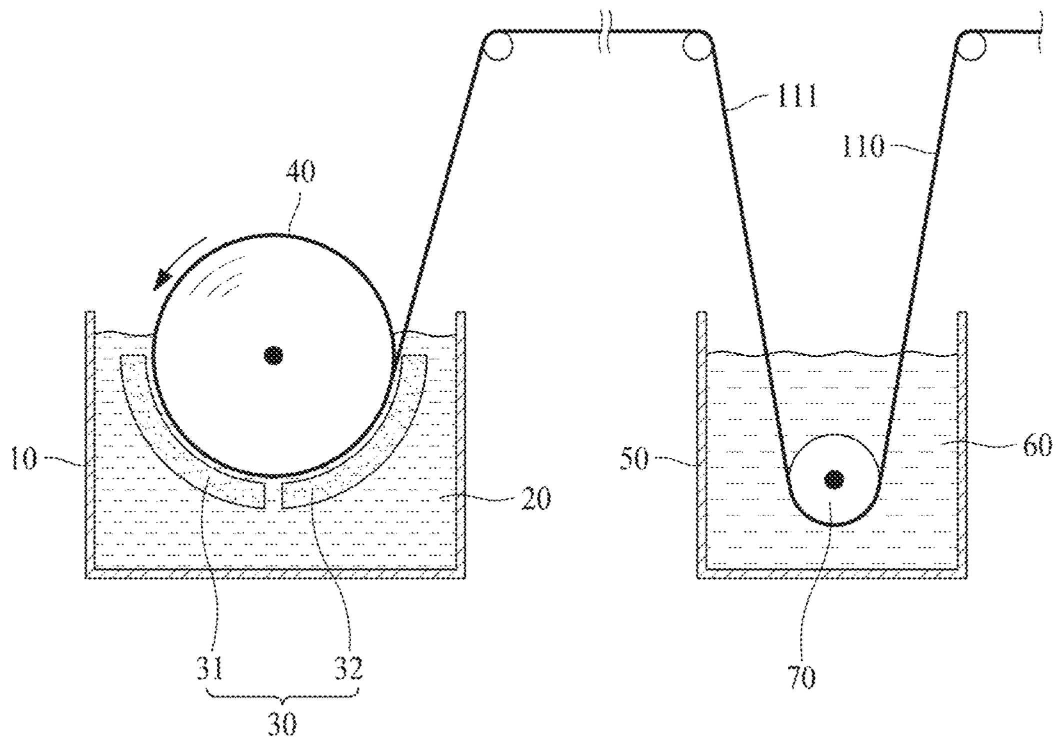
FIG. 6 is a device for manufacturing a copper foil according to yet another embodiment of the present disclosure.

As illustrated in FIG. 6, the cathode plate 30 may include first and second cathode plates 31 and 32 electrically insulated from each other.

The forming of the copper film 111 may be performed by forming a seed layer through an electrical connection between the first cathode plate 31 and the rotating anode drum 40, and then growing a seed layer through an electrical connection between the second cathode plate 32 and the rotating anode drum 40.

A current density provided by each of the first and second cathode plates 31 and 32 may be 30 to 130 ASD ($A/dm^2$).

When the current density provided by each of the first and second cathode plates 31 and 32 is less than 30 ASD, a surface roughness of the copper foil 110 is reduced, and thus the adhesion between the copper foil 110 and the active material layer 120 may not be sufficient.

On the other hand, when the current density provided by each of the first and second cathode plates 31 and 32 exceeds 130 ASD, a surface of the copper foil 110 may be rough, and thus the active material may not be smoothly coated.

The surface characteristics of the copper film 111 may be changed according to a buffing or polishing degree of a surface of the rotating anode drum 40. For example, the surface of the rotating anode drum 40 may be polished using a polishing brush having a grit of #800 to #3000.

In the process of forming the copper film 111, the electrolyte 20 is maintained at a temperature of 48° C. to 60° C. More specifically, the temperature of the electrolyte 20 may be maintained at 50° C. or higher. At this time, the physical, chemical, and electrical characteristics of the copper film 111 may be controlled by adjusting a composition of the electrolyte 20.

According to one embodiment of the present disclosure, the electrolyte 20 includes copper ions at a concentration of 70 g/L to 100 g/L, sulfuric acid at a concentration of 70 g/L to 150 g/L, chlorine (Cl) at a concentration of 15 ppm to 25 ppm, nickel (Ni) at a concentration of 15 ppm to 150 ppm, lead ions ($Pb^{2+}$) at a concentration of 1 ppm to 20 ppm, hydrogen peroxide ($H_2O_2$) at a concentration of 1 ml/L to 10 ml/L, tungsten (W) at a concentration of 0.3 ppm to 5 ppm, and an organic additive.

In order to facilitate the formation of the copper film 111 through copper electrodeposition, the concentration of copper ions and the concentration of sulfuric acid in the electrolyte 20 are adjusted in a range of 70 g/L to 100 g/L and a range of 70 g/L to 150 g/L, respectively.

In one embodiment of the present disclosure, the chlorine (Cl) includes both chlorine ions (Cl−) and chlorine atoms present in a molecule. The chlorine (Cl) may be used, for example, to remove silver (Ag) ions input into the electrolyte 20 in the process of forming the copper film 111. Specifically, the chlorine (Cl) may precipitate silver (Ag) ions in the form of silver chloride (AgCl). The silver chloride (AgCl) may be removed through filtration.

When the concentration of chlorine (Cl) is less than 15 ppm, the silver (Ag) ions are not removed well. On the other hand, when the concentration of chlorine (Cl) exceeds 25 ppm, unnecessary reactions may occur due to the excessive amount of chlorine (Cl). Accordingly, the concentration of chlorine (Cl) in the electrolyte 20 is controlled to be in a range of 15 ppm to 25 ppm.

According to one embodiment of the present disclosure, the electrolyte 20 including an organic additive may further include hydrogen peroxide ($H_2O_2$). Due to the organic additive, organic impurities may be present in the electrolyte 20 that is continuously plated, and a content of carbon (C) in the copper foil may be appropriately adjusted by decomposing the organic impurities by treating the organic impurities with hydrogen peroxide ($H_2O_2$). As a concentration of total organic carbon (TOC) in the electrolyte 20 is increased, an amount of carbon (C) elements introduced into the copper film 111 is increased, which causes an increase in total amount of elements detached from the copper film 111 during heat treatment. Accordingly, the desired first to third stress factor values may not be obtained, and as a result, wrinkles or tears may occur, and pinholes or curls may occur on the surface of the copper foil 110.

The hydrogen peroxide ($H_2O_2$) is added in an amount of 1 ml to 10 ml per one L of the electrolyte. Specifically, the hydrogen peroxide ($H_2O_2$) may be added in an amount of 2 ml to 8 ml per one L of the electrolyte. When the amount of added hydrogen peroxide ($H_2O_2$) is less than 1 ml/L, there is little effect on the decomposition of organic impurities, and thus an amount of carbon (C) elements introduced into the copper film 111 is increased, which causes an increase in total amount of elements detached from the copper film 111 during heat treatment. Accordingly, the desired first to third stress factor values may not be obtained, and as a result, wrinkles or tears may occur, and pinholes or curls may occur on the surface of the copper foil 110.

When the amount of added hydrogen peroxide ($H_2O_2$) exceeds 10 ml/L, the organic impurities are excessively decomposed, and thus the effects of organic additives, such as a polishing agent, a moderator, and a leveling agent, are also suppressed.

According to one embodiment of the present disclosure, the electrolyte 20 including an organic additive may further include tungsten (W). When the electrolyte 20 is treated with tungsten (W), the average size of the crystalline particles included in the copper film 111 may be reduced, and the strength of the copper foil 110 may be increased. The concentration of tungsten (W) in the electrolyte 20 may be in a range of 0.3 ppm to 5 ppm. Specifically, it is preferable that the tungsten (W) is added at a concentration of 1 ppm to 4 ppm.

When the amount of added tungsten (W) is less than 0.3 ppm, an average crystalline particle size of the copper film 111 may not be sufficiently small, and the strength of the copper foil 110 is reduced. In addition, the average crystalline particle size of the copper film 111 becomes non-uniform, and thus the desired first to third stress factor values may not be obtained. As a result, wrinkles or tears may occur, and pinholes or curls may occur on the surface of the copper foil 110.

On the other hand, when the amount of added tungsten (W) exceeds 5 ppm, impurities may be increased, and the effect of the organic additive may be suppressed. In addition, due to the excessive impurities, a sudden change in the stress value of the copper foil 110 may occur. As a result, the desired first to third stress factor values may not be obtained, consequently, wrinkles or tears may occur, and pinholes or curls may occur on the surface of the copper foil 110.

According to one embodiment of the present disclosure, the electrolyte 20 including an organic additive may further include 1 ppm to 20 ppm of lead ions ($Pb^{2+}$). The lead ions ($Pb^{2+}$) in the electrolyte 20 are controlled to have a concentration of 1 ppm to 20 ppm. In order to maintain the concentration of lead ions ($Pb^{2+}$), a material that does not include lead (Pb) may be used as a raw material input to the electrolyte 20.

When the concentration of lead ions ($Pb^{2+}$) is less than 1 ppm, a problem may occur where effectiveness is reduced in terms of maintaining the physical properties of the present disclosure. As a result, the desired first to third stress factor values may not be obtained, consequently, wrinkles or tears may occur, and pinholes or curls may occur on the surface of the copper foil 110.

When the concentration of lead ions ($Pb^{2+}$) exceeds 20 ppm, the lead ions ($Pb^{2+}$) should be removed from the electrolyte 20 using an ion exchange filter, wrinkles or tears may occur because copper is non-uniformly precipitated, and pinholes or curls may occur on the surface of the copper foil 110. In addition, as the copper is non-uniformly precipitated, a sudden change in the stress value of the copper foil 110 may occur. As a result, the desired first to third stress factor values may not be obtained, consequently, wrinkles or tears may occur, and pinholes or curls may occur on the surface of the copper foil 110.

According to one embodiment of the present disclosure, the electrolyte 20 including an organic additive may further include nickel (Ni) at a concentration of 15 ppm to 150 ppm. The concentration of nickel (Ni) in the electrolyte 20 is controlled to be in a range of 15 ppm to 150 ppm.

When the concentration of nickel (Ni) exceeds 150 ppm, the strength of the copper foil 110 is reduced, which may cause difficulties in manufacturing the high-strength copper foil 110. In addition, a sudden change in the stress value of the copper foil 110 may occur. As a result, the desired first to third stress factor values may not be obtained, consequently, wrinkles or tears may occur, and pinholes or curls may occur on the surface of the copper foil 110.

On the other hand, when the concentration of nickel (Ni) is less than 15 ppm, the surface roughness of the copper foil 110 may increase excessively, and thus the strength of the copper foil 110 may be reduced, and curls may occur on the surface of the copper foil 110. In addition, a sudden change in the stress value of the copper foil 110 may occur. As a result, the desired first to third stress factor values may not be obtained, consequently, wrinkles or tears may occur, and pinholes or curls may occur on the surface of the copper foil 110.

The organic additive included in the electrolyte 20 includes at least one of a polishing agent (component A), a moderator (component B), a leveling agent (component C), and a mitigation agent (component D). The organic additive in the electrolyte 20 has a concentration of 1 ppm to 100 ppm.

The organic additive may include two or more of the polishing agent (component A), the moderator (component B), the leveling agent (component C), and the mitigation agent (component D) and may include all of the four components. Even in this case, the concentration of organic additive is 100 ppm or less. When the organic additive includes all of the polishing agent (component A), the moderator (component B), the leveling agent (component C), and the mitigation agent (component D), the organic additive may have a concentration of 10 ppm to 100 ppm.

The polishing agent (component A) includes sulfonic acid or a metal salt thereof. The polishing agent (component A) may have a concentration of 1 ppm to 25 ppm in the electrolyte 20.

The polishing agent (component A) may increase an amount of electric charges in the electrolyte 20 to improve an electrodeposition rate of copper, may improve the curling characteristics of the copper foil, and may increase the gloss of the copper foil 110. When the concentration of polishing agent (component A) is less than 1 ppm, the gloss of the copper foil 110 is reduced, and when the concentration of polishing agent (component A) exceeds 25 ppm, wrinkles or tears may occur in the copper foil 110, pinholes or curls may occur on the surface of the copper foil 110, and a sudden change in the stress value of the copper foil 110 may occur. As a result, the desired first to third stress factor values may not be obtained, consequently, wrinkles or tears may occur, and pinholes or curls may occur on the surface of the copper foil 110.

More specifically, the polishing agent (component A) may have a concentration of 5 ppm to 20 ppm in the electrolyte 20.

The polishing agent may include, for example, at least one selected from among a bis-(3-sulfopropyl)-disulfide disodium salt, 3-mercapto-1-propanesulfonic acid, a 3-(N,N-dimethylthiocarbamoyl)-thiopropanesulfonate sodium salt, a 3-[(amino-iminomethyl)thio]-1-propanesulfonate sodium salt, an O-ethyldithiocarbonato-S-(3-sulfopropyl)-ester sodium salt, a 3-(benzothiazolyl-2-mercapto)-propyl-sulfonic acid sodium salt, and an ethylenedithiodipropylsulfonic acid sodium salt.

The moderator (component B) includes a non-ionic water-soluble polymer. The moderator (component B) may have a concentration of 1 ppm to 15 ppm in the electrolyte 20.

The moderator (component B) reduces the electrodeposition rate of copper to prevent a rapid increase in roughness and a decrease in strength of the copper foil 110. This moderator (component B) is referred to as an inhibitor or suppressor.

When the concentration of moderator (component B) is less than 1 ppm, the roughness of the copper foil 110 rapidly rises, and the strength of the copper foil 110 may be reduced. As a result, wrinkles or tears may occur in the copper foil 110, and pinholes or curls may occur on the surface of the copper foil 110. In addition, a sudden change in the stress value of the copper foil 110 may occur. As a result, the desired first to third stress factor values may not be obtained, consequently, wrinkles or tears may occur, and pinholes or curls may occur on the surface of the copper foil 110.

On the other hand, although the concentration of moderator (component B) exceeds 15 ppm, there is almost no change in physical properties such as the appearance, gloss, roughness, strength, and elongation of the copper foil 110. Accordingly, the concentration of moderator (component B) may be adjusted in a range of 1 ppm to 10 ppm without increasing manufacturing costs and wasting raw materials due to an unnecessary increase in concentration of moderator (component B).

The moderator (component B) may include, for example, at least one non-ionic water-soluble polymer selected from among a polyethylene glycol (PEG), polypropylene glycol, a polyethylene/polypropylene copolymer, polyglycerin, polyethylene glycol dimethyl ether, hydroxyethylene cellulose, polyvinyl alcohol, stearic acid polyglycol ether, and stearyl alcohol polyglycol ether. However, the type of moderator is not limited thereto, and other non-ionic water-soluble polymers that can used to manufacture the high strength copper foil 110 may be used as the moderator.

The leveling agent (component C) includes at least one of nitrogen (N) and sulfur (S). That is, the leveling agent (component C) may include one or more nitrogen atoms (N) or one or more sulfur atoms (S) in one molecule and may include one or more nitrogen atoms (N) and one or more sulfur atoms (S). For example, the leveling agent (component C) is an organic compound including at least one of nitrogen (N) and sulfur (S).

The leveling agent (component C) prevents excessively high peaks or excessively large protrusions from being generated in the copper film 111 to allow the copper film 111 to be macroscopically flat. The leveling agent (component C) may have a concentration of 1 ppm to 15 ppm in the electrolyte 20.

When the concentration of leveling agent (component C) is less than 1 ppm, the strength of the copper foil 110 is reduced, which may cause difficulties in manufacturing the high-strength copper foil 110. In addition, a sudden change in the stress value of the copper foil 110 may occur. As a result, the desired first to third stress factor values may not be obtained, consequently, wrinkles or tears may occur, and pinholes or curls may occur on the surface of the copper foil 110.

On the other hand, when the concentration of leveling agent (component C) exceeds 15 ppm, the surface roughness of the copper foil 110 may increase excessively, which may reduce the strength of the copper foil 110, and pinholes or curls may occur on the surface of the copper foil 110, which makes it difficult to separate the copper foil 110 from a winder WR after being manufactured. In addition, when the concentration of leveling agent (component C) exceeds 15 ppm, a sudden change in the stress value of the copper foil 110 may occur. As a result, the desired first to third stress factor values may not be obtained.

The leveling agent (component C) may include, for example, at least one selected from among diethylthiourea, ethylenethiourea, acetylenethiourea, dipropylthiourea, dibutylthiourea, N-trifluoroacetylthiourea, N-ethylthiourea, N-cyanoacetylthiourea, N-allylthiourea, o-tolylthiourea, N,N'-butylenethiourea, thiazolidinethiol, 4-thiazolinethiol, 4-methyl-2-pyrimidinethiol, 2-thiouracil, a 3-\(benzotriazole-2-mercapto\)-pyrosulfuric acid, 2-mercaptopyridine, 3-\(5-mercapto-1H-tetrazole\)benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl- 2-methylimidazole, 1-benzyl-2-methylimidazole, 1-ethyl-4-methylimidazole, 1-ethyl-2-ethyl-4-methylol, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole, and N-butylcarbazole.

The mitigation agent (component D) may include citric acid (CA). Specifically, the electrolyte 20 may include 1 ppm to 5 ppm of citric acid (CA).

When the concentration of citric acid (CA) in the electrolyte 20 exceeds 5 ppm, the surface roughness of the copper foil 110 may increase excessively, which may reduce the strength of the copper foil 110, and pinholes may occur on the surface of the copper foil 110. In addition, a sudden change in the stress value of the copper foil 110 may occur. As a result, the desired first to third stress factor values may not be obtained.

On the other hand, when the concentration of citric acid (CA) in the electrolyte 20 is less than 1 ppm, the strength of the copper foil 110 is reduced, which may cause difficulties in manufacturing the high-strength copper foil 110. In addition, a sudden change in the stress value of the copper foil 110 may occur. As a result, the desired first to third stress factor values may not be obtained, and thus, wrinkles or tears may occur, and pinholes or curls may occur on the surface of the copper foil 110.

When forming the copper film 111, a flow rate of the electrolyte 20 supplied into the electrolytic bath 10 may be 41 $m^3$/hour to 45 $m^3$/hour.

The forming of the copper film 111 may include at least one of filtering the electrolyte 20 using activated carbon, filtering the electrolyte 20 using diatomaceous earth, and treating the electrolyte 20 with ozone ($O^3$).

Specifically, in order to filter the electrolyte 20, the electrolyte 20 may be circulated at a flow rate of 35 $m^3$/hour to 45 $m^3$/hour. That is, in order to remove solid impurities present in the electrolyte 20 while electroplating to form the copper film 111, filtering may be performed at the flow rate of 35 $m^3$ hour to 45 $m^3$/hour. In this case, activated carbon or diatomaceous earth may be used.

In order to maintain the cleanliness of the electrolyte 20, the electrolyte 20 may be treated with ozone ($O^3$).

In addition, in order to maintain the cleanliness of the electrolyte 20, a copper (Cu) wire used as a raw material for the electrolyte 20 may be cleaned.

According to one embodiment of the present disclosure, the preparation of the electrolyte 20 may include heat-treating a Cu wire, cleaning the heat-treated Cu wire with acid, cleaning the acid-cleaned Cu wire with water, and inputting the water-cleaned Cu wire into sulfuric acid for an electrolyte.

More specifically, in order to maintain the cleanliness of the electrolyte 20, a Cu wire with a high purity (99.9% or more) is heat-treated in an electric furnace at a temperature of 750° ° C. to 850° C. to burn off various organic impurities attached to the Cu wire, the heat-treated Cu wire is acid-cleaned using a 10% sulfuric acid solution for 10 to 20 minutes, and the acid-cleaned Cu wire is then water-cleaned using distilled water, thereby preparing copper for preparing the electrolyte 20. The water-cleaned Cu wire may be input into sulfuric acid for an electrolyte to prepare the electrolyte 20.

According to one embodiment of the present disclosure, in order to satisfy the characteristics of the copper foil 110, a concentration of TOC in the electrolyte 20 is controlled to be 50 ppm or less. That is, the electrolyte 20 may have a TOC concentration of 50 ppm or less.

The copper film 111 thus prepared may be cleaned in a cleaning bath.

For example, an acid cleaning process for removing impurities on a surface of the copper film 111, for example, resin components or natural oxides, and a water cleaning process for removing acidic solutions used for the acid cleaning may be sequentially performed. The cleaning processes may be omitted.

Next, the protective layer 112 is formed on the copper film 111.

Referring to FIG. 6, the method may further include immersing the copper film 111 in an anticorrosion solution 60. When the copper film 111 is immersed in the anticorrosion solution 60, the copper film 111 may be guided by a guide roll disposed in the anticorrosion solution 60.

As described above, the anticorrosion solution 60 may include at least one of a chromium compound, a silane compound, and a nitrogen compound. For example, the copper film 111 may be immersed in a 1 g/L to 10 g/L potassium dichromate solution at room temperature for 1 to 30 seconds.

Meanwhile, the protective layer 112 may include a silane compound by silane treatment or a nitrogen compound by nitrogen treatment.

The copper foil 110 is formed by forming the protective layer 112.

At least one anode active material selected from the group consisting of carbon, a metal (Me) of Si, Ge, Sn, Li, Zn, Mg, Cd, Ce, Ni or Fe, an alloy including the metal (Me), an oxide (MeOx) of the metal (Me), and a composite of the metal (Me) and carbon is coated on one surface or both surfaces the copper foil 110 of the present disclosure prepared through the method as described above to manufacture an electrode (i.e., anode) for a secondary battery of the present disclosure.

For example, 100 parts by weight of carbon for an anode active material, 1 to 3 parts by weight of styrene butadiene rubber (SBR), and 1 to 3 parts by weight of carboxymethyl cellulose (CMC) are mixed and prepared as a slurry using distilled water as a solvent. Subsequently, the slurry is applied on the copper foil 110 to a thickness of 20 μm to 60 μm using a doctor blade and pressed at a pressure of 0.5 to 1.5 ton/$cm^2$ at 110° C. to 130° C.

A secondary battery may be manufactured using the electrode (anode) for a secondary battery of the present disclosure manufactured through the method as described above, together with a conventional cathode, electrolyte and separator.

Hereinafter, the present disclosure will be described in detail with reference to examples and comparative examples. However, the examples described below are only intended to aid the understanding of the present disclosure, and the scope of the present disclosure is not limited to these examples.

Examples 1 to 5 and Comparative Examples 1 to 4

A copper foil was prepared using a foil maker including an electrolytic bath 10, a rotating anode drum 40 disposed in the electrolytic bath 10, and a cathode plate 30 disposed to be spaced apart from the rotating anode drum 40. An electrolyte 20 was a copper sulfate solution. A concentration of copper ions in the electrolyte 20 was set to 87 g/L, a concentration of sulfuric acid was set to 110 g/L, a temperature of the electrolyte was set to 55° C., and a current density was set to 60 ASD In addition, concentrations of chlorine (Cl), nickel (Ni), lead (Pb), hydrogen peroxide, and tungsten (W), which are contained in the electrolyte 20, and a concentration of an organic additive were as shown in Table 1 below.

In the organic additive, a bis-(3-sulfopropyl)-disulfide disodium salt (SPS) was used as a polishing agent (component A), PEG was used as a moderator (component B), and ethylene thiourea (ETU) was used as a leveling agent (component C).

A current at a current density of 60 ASD was applied between the rotating anode drum 40 and the cathode plate 30 to manufacture a copper film 111. Thereafter, the copper film 111 was immersed in an anticorrosion solution for about two seconds to perform chromate treatment on the surface of the copper film 111 to form a protective layer 112, thereby manufacturing a copper foil 110. An anticorrosion solution containing chromic acid as a main component was used as the anticorrosion solution, and a concentration of chromic acid was 5 g/L.

As a result, copper foils of Examples 1 to 5 and Comparative Examples 1 to 4 were manufactured.

TABLE 1

| | SPS (Component A) (ppm) | PEG (Component B) (ppm) | ETU (Component C) (ppm) | CA (component D) (ppm) | Chlorine (ppm) | Nickel (ppm) | Lead (ppm) | Hydrogen peroxide (ml/L) | Tungsten (ppm) |
|---|---|---|---|---|---|---|---|---|---|
| Example 1 | 5 | 2 | 3 | 1 | 20 | 50 | 10 | 2 | 1 |
| Example 2 | 10 | 4 | 5 | 3 | 20 | 60 | 15 | 5 | 3 |
| Example 3 | 15 | 6 | 7 | 5 | 20 | 80 | 15 | 7 | 5 |
| Example 4 | 20 | 8 | 9 | 2 | 20 | 100 | 18 | 7 | 1 |
| Example 5 | 15 | 10 | 10 | 4 | 20 | 120 | 8 | 5 | 3 |
| Comparative Example 1 | 55 | 5 | 5 | 5 | 20 | 5 | 0.1 | 5 | 0.1 |
| Comparative Example 2 | 10 | 50 | 7 | 5 | 20 | 50 | 0.1 | 0.1 | 1 |
| Comparative Example 3 | 15 | 7 | 55 | 3 | 20 | 30 | 15 | 15 | 10 |
| Comparative Example 4 | 10 | 5 | 7 | 55 | 20 | 200 | 50 | 5 | 3 |

TABLE 2

| | MD direction | | | TD direction | | | First stress factor | Second stress factor | Third stress factor | Occurrence of |
|---|---|---|---|---|---|---|---|---|---|---|
| Classification | A (Pa) | B (Pa) | C (Pa) | A' (Pa) | B' (Pa) | C' (Pa) | (A/A' + B/B' + C/C') | (A/B + A'/B') | (A/C + A'/C') | wrinkles/tears |
| Example 1 | 48.7 | 37.2 | 23.2 | 48.3 | 37.9 | 24.1 | 2.95 | 2.58 | 4.10 | no |
| Example 2 | 55.3 | 42.1 | 26.2 | 55.2 | 44.2 | 24.1 | 3.04 | 2.56 | 4.40 | no |
| Example 3 | 45.3 | 32.1 | 23.9 | 46.9 | 36.8 | 23.4 | 2.86 | 2.69 | 3.90 | no |
| Example 4 | 52.2 | 39.2 | 24.8 | 50.4 | 41.2 | 25.4 | 2.96 | 2.55 | 4.09 | no |
| Example 5 | 49.3 | 37.4 | 24.1 | 48.8 | 38.2 | 23.4 | 3.02 | 2.60 | 4.13 | no |
| Comparative Example 1 | 53.2 | 44.8 | 32.1 | 57.2 | 46.8 | 33.6 | 2.84 | 2.41 | 3.36 | Occurance |
| Comparative Example 2 | 36.2 | 29.9 | 21.1 | 38.3 | 31.9 | 25.7 | 2.83 | 2.41 | 3.44 | Occurance |
| Comparative Example 3 | 41.8 | 33.2 | 21.1 | 46.9 | 36.8 | 25.7 | 2.61 | 2.53 | 3.81 | Occurance |
| Comparative Example 4 | 50.2 | 43.2 | 30.8 | 50.1 | 46.8 | 34.2 | 2.83 | 2.23 | 3.09 | Occurance |

For the copper foils of Examples 1 to 5 and Comparative Examples 1 to 4 manufactured as described above, i) A, A', B, B', C, and C' ii) first stress factor, iii) second stress factor, iv) third stress factor, and v) occurrence of wrinkles/tears were checked.

Measurement of a, A', B, B', C, and C'

A represents a stress at 50% elongation of the copper foil in an MD direction, A' represents a stress at 50% elongation of the copper foil in a TD direction, B represents a stress at 10% elongation of the copper foil 110 in the MD direction, B' represents a stress at 10% elongation of the copper foil 110 in the TD direction, C represents a stress at 5% elongation of the copper foil in the MD direction, and "C'" represents a stress at 5% elongation of the copper foil in the TD direction.

A, A', B, B', C, and C' were measured using a universal testing machine (UTM, INSTRON) according to the method specified in the IPC-TM-650 test method manual. A width of a sample was 12.7 mm, a distance between grips was 50 mm, and a measurement speed was 50 mm/min.

A was obtained by measuring a stress after 50% elongation of the copper foil in the MD direction under the same conditions as above, A' was obtained by measuring a stress after 50% elongation of the copper foil in the TD direction under the same conditions as above, B was obtained by measuring a stress after 10% elongation of the copper foil in the MD direction under the same conditions as above, B' was obtained by measuring a stress after 10% elongation of the copper foil in the TD direction under the same conditions as above, C was obtained by measuring a stress after 5% elongation of the copper foil in the MD direction under the same conditions as above, and C' was obtained by measuring a stress after 5% elongation of the copper foil in the TD direction under the same conditions as above. The elongation length of the copper foil when measuring the breaking stress of the copper foil sample in the universal testing machine was defined as maximum elongation, and the stress at 50% elongation compared to the maximum elongation of the copper foil was defined as stress at 50% elongation. Likewise, the stress at 10% elongation compared to the maximum elongation of the copper foil was defined as stress at 10% elongation, and the stress at 5% elongation compared to the maximum elongation of the copper foil was defined as stress at 5% elongation.

ii) Calculation of First Stress Factor

The first stress factor value may be obtained by substituting the measured A, A', B, B', C, and C' values into Equation 1 below.

$$\text{First stress factor} = A/A' + B/B' + C/C'. \quad \text{[Equation 1]}$$

iii) Calculation of Second Stress Factor

The second stress factor value may be obtained by substituting the measured A, A', B, and B' values into Equation 2 below.

$$\text{Second stress factor} = A/B + A'/B'. \quad \text{[Equation 2]}$$

iv) Calculation of Third Stress Factor

The third stress factor value may be obtained by substituting the measured A, A', C, and C' values into Equation 3 below.

$$\text{Third stress factor} = A/C + A'/C'. \quad \text{[Equation 3]}$$

v) Occurrence of Wrinkles/Tears

After charging and discharging 100 times, the secondary battery was disassembled to observe whether wrinkles or tears occurred in the copper foil. When the copper foil was wrinkled or torn, the copper foil was marked as "occurred," and when the copper foil was not wrinkled or torn, the copper foil was marked as "none."

Referring to Tables 1 and 2, the following results can be confirmed.

Tears/wrinkles occurred in the copper foil of Comparative Example 1 prepared using an electrolyte including a polishing agent (component A) in an excessive amount, and nickel, lead, and tungsten in small amounts.

Tears/wrinkles occurred in the copper foil of Comparative Example 2 prepared using an electrolyte including a moderator (component B) in an excessive amount, and lead and hydrogen peroxide in small amounts.

Tears/wrinkles occurred in the copper foil of Comparative Example 3 prepared using an electrolyte including a leveling agent (component C), hydrogen peroxide and tungsten in excessive amounts.

Tears/wrinkles occurred in the copper foil of Comparative Example 4 prepared using an electrolyte including a mitigation agent (component D), nickel and lead in excessive amounts.

On the other hand, all the copper foils of Examples 1 to 4 according to the present disclosure satisfied values within the above standard ranges, resulting in no occurrence of tears/wrinkles.

According to the present disclosure, it is possible to manufacture a copper foil in which the occurrence of wrinkles or tears during a manufacturing process can be prevented, and intermediate parts and final products, such as flexible printed circuit boards (FPCBs) and secondary batteries, can be manufactured using the copper foil, so that productivity of the intermediate parts as well as the final products can be improved.

It will be apparent to those skilled in the art that the present disclosure described above is not limited by the above-described embodiments and the accompanying drawings and that various substitutions, modifications, and variations can be made in the present disclosure without departing from the spirit and scope of the present disclosure. Accordingly, the scope of the present disclosure is defined by the accompanying claims, and it is intended that all variations and modifications derived from the meaning, scope, and equivalent concept of the claims fall within the scope of the present disclosure.

DESCRIPTION OF REFERENCE NUMERALS

100: electrode for second battery
110: copper foil
111: copper film
120: active material layer
10: electrolytic bath
20: electrolyte

What is claimed is:

1. A copper foil comprising a copper film including 99.9 wt % or more of copper, wherein the copper foil has a first stress factor of 2.8 or more, a second stress factor of 2.5 or more, and a third stress factor of 3.5 or more, wherein the first stress factor is calculated by Equation 1, $$\text{first stress factor} = A/A' + B/B' + C/C', \quad \text{[Equation 1]}$$

the second stress factor is calculated by Equation 2, $$\text{second stress factor} = A/B + A'/B', \quad \text{[Equation 2]}$$

and the third stress factor is calculated by Equation 3 below, $$\text{third stress factor} = A/C + A'/C', \quad \text{[Equation 3]}$$

wherein A in Equation 1 is a stress at 50% elongation in a machine direction (MD direction), A' in Equation 1 is a stress at 50% elongation in a transverse direction (TD direction), B in Equation 1 is a stress at 10% elongation in the MD direction, B' in Equation 1 is a stress at 10% elongation in the TD direction, C in Equation 1 is a stress at 5% elongation in the MD direction, and C' in Equation 1 is a stress at 5% elongation in the TD direction.

2. The copper foil of claim 1, further comprising a protective layer formed on the copper film.

3. The copper foil of claim 2, wherein the protective layer includes at least one of a chromium compound, a silane compound, and a nitrogen compound.

* * * * *